US011593816B1

(12) United States Patent
O'Donovan

(10) Patent No.: US 11,593,816 B1
(45) Date of Patent: Feb. 28, 2023

(54) INTEGRATING FRAUD TELEMETRY VENDOR

(71) Applicant: Morgan Stanley Services Group Inc., New York, NY (US)

(72) Inventor: Declan O'Donovan, Great Falls, VA (US)

(73) Assignee: MORGAN STANLEY SERVICES GROUP INC., New York, NY (US)

( * ) Notice: Subject to any disclaimer, the term of this patent is extended or adjusted under 35 U.S.C. 154(b) by 0 days.

(21) Appl. No.: 17/847,544

(22) Filed: Jun. 23, 2022

(51) Int. Cl.
*H04L 67/02* (2022.01)
*G06Q 30/018* (2023.01)

(52) U.S. Cl.
CPC ......... *G06Q 30/0185* (2013.01); *H04L 67/02* (2013.01)

(58) Field of Classification Search
CPC ............................ G06Q 30/0185; H04L 67/02
See application file for complete search history.

(56) References Cited

U.S. PATENT DOCUMENTS

| | | | | |
|---|---|---|---|---|
| 2017/0034023 | A1* | 2/2017 | Nickolov | H04L 43/0817 |
| 2019/0230122 | A1 | 7/2019 | Chin et al. | |
| 2019/0370856 | A1* | 12/2019 | Cahn | H04L 43/062 |
| 2019/0391800 | A1 | 12/2019 | Lin et al. | |
| 2020/0065813 | A1* | 2/2020 | Walters | G06N 3/084 |
| 2020/0322355 | A1* | 10/2020 | Morgan | H04L 63/126 |
| 2021/0035108 | A1* | 2/2021 | Bull | G06Q 20/4016 |

FOREIGN PATENT DOCUMENTS

| | | | | |
|---|---|---|---|---|
| CA | 2801659 A1 | * | 7/2013 | G06F 21/60 |
| CN | 107481090 A | * | 12/2017 | G06F 16/2474 |
| WO | WO-2012073233 A1 | * | 6/2012 | G01C 9/00 |
| WO | WO-2015148458 A1 | * | 10/2015 | G06F 16/95 |

OTHER PUBLICATIONS

Marko Schuba, "Security for Mobile Commerce Applications", 2001, IEEE/WSES, pp. 1-10. (Year: 2001).*
C.W. Jordan, "Zephyr: A Secure Internet-Based Process to Streamline Engineering", 1997, WebNet World Conference, Toronto, Canada, Nov. 1-5, 1997, pp. 1-10. (Year: 1997).*
Jan Hendrik Hausmann, "Detection of Conflicting Functional Requirements in a Use Case-Driven Approach," May 19, 2002, JSCE, pp. 105-115. (Year: 2002).*
Jerome Swartz, "Security Systems for a Mobile World", 2003, Technology in Society 25 (2003), pp. 5-25. (Year: 2003).*

* cited by examiner

*Primary Examiner* — Tan D Nguyen
(74) *Attorney, Agent, or Firm* — K&L Gates LLP

(57) ABSTRACT

A firm computer system is configured to add a new third party telemetry vendor. An incumbent third party telemetry vendor communicates with the firm computer system using HTTP requests that include HTTP headers, including a first telemetry-related HTTP header. The new third party telemetry vendor communicates with the firm computer system using HTTP requests that include the first telemetry-related HTTP header. The new third party telemetry vendor appends its telemetry data to the first telemetry-related HTTP, separating it in the first telemetry-related HTTP from telemetry data from the incumbent third party telemetry vendor according to a predefined syntax.

10 Claims, 4 Drawing Sheets

FraudHeader1: xxxxx||newfraudvar1|123||newfraudvar2|345||newfraudvar3|567

Ignore this part

FIG. 4

FraudHeader1: xxxxx||newfraudvar1|123||newfraudvar2|345||newfraudvar3|567

Ignore this part

INTEGRATING FRAUD TELEMETRY VENDOR

BACKGROUND

In today's highly complex, web-based ecosystem for electronic financial transactions, when a user initiates a financial transaction, such as a stock trade or wire transfer, for example, with a financial services firm, information from the user request for high-risk user transactions is sent to a third party vendor for risk analysis. The vendor responds to the financial services firm a risk score for the transaction. Based on that score, the financial services firm can, for example, perform the requested financial transaction, block it, or require the user to perform an action that, if completed successfully, would reduce the risk, such as two-factor authentication or a challenge-response task (e.g., a CAPTCHA task).

Integrating a new fraud telemetry vendor into an existing transaction system is a complex endeavor. Even testing a new vendor to compare the new vendor's effectiveness with incumbent vendors is a daunting, multi-person, lengthy (several month) undertaking.

SUMMARY

In one general aspect, the present invention is directed to computer-based systems and methods to configure a firm computer system, which processes user requests, to receive telemetry data about the user requests from two different, third party fraud telemetry vendors. The two different, third party fraud telemetry vendors can include an incumbent third party fraud telemetry vendor and a newly added third party fraud telemetry vendor. The new third party fraud telemetry vendor can append its telemetry data for the user requests to a telemetry-related HTTP header used by the incumbent third party fraud telemetry vendor. The existing logic of a fraud decisioning engine orchestration system of the firm computer system is already programmed to detect the existing HTTP header as part of being programmed to handle the data from the incumbent fraud/telemetry vendor. That way, using its existing logic, the fraud decisioning engine orchestration system can send the value for the header to the appropriate fraud decisioning engine. These and other benefits that can be realized through embodiments of the present invention will be apparent from the description that follows.

FIGURES

Various embodiments of the present invention are described by way of example in conjunction with the following figures.

FIG. 4 shows how a decisioning engine of the firm computer system for the incumbent third party fraud telemetry vendor ignores data in the HTTP header of FIG. 3 for the new third party fraud telemetry vendor.

FIG. 5 shows how a decisioning engine of the firm computer system for the new third party fraud telemetry vendor ignores data in the HTTP header of FIG. 3 for the incumbent third party fraud telemetry vendor.

DESCRIPTION

Figure 1:
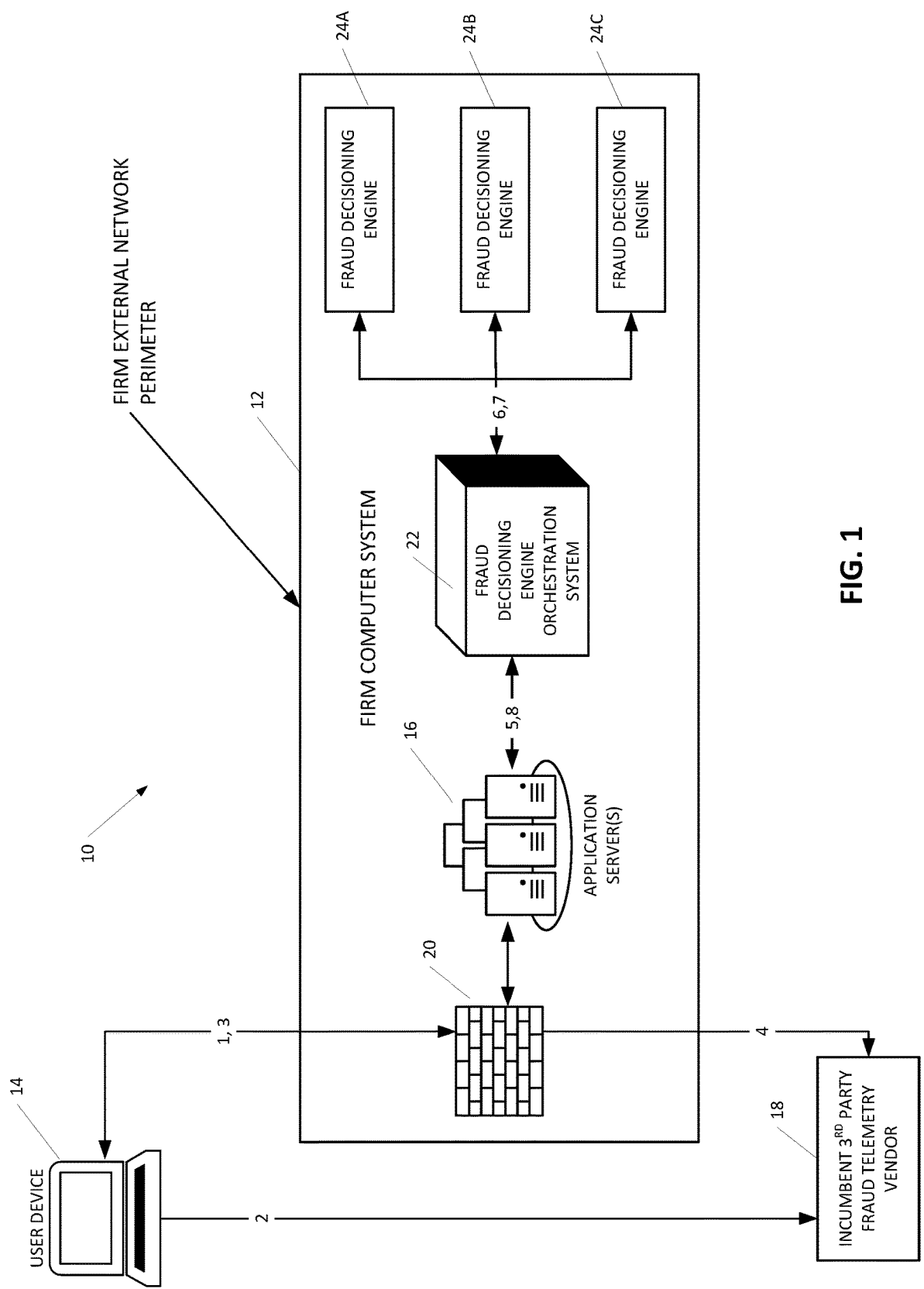
FIG. 1 is diagram showing a firm computer system that is configured to communicate with an incumbent third party fraud telemetry vendor according to various embodiments of the present invention.

FIG. 1 is a diagram of a computer system 10 that includes a firm computer system 12 that handles financial transactions from a user at a user device 14. The computer system 10 depicted in FIG. 1 can be considered a "current" or "existing" computer system prior to the addition and integration of a new fraud telemetry vendor system. Instead, the computer system 10 of FIG. 1 includes an incumbent, or existing, third party fraud telemetry vendor 18 that is separate from the firm computer system 14 (e.g., the incumbent third party fraud telemetry vendor 18 is outside the external network perimeter for the firm computer system 12 and on the other side of the firm's firewall 20 from the firm's computer systems).

The user device 14 is in communication with the firm computer system 12 via an electronic data network such as the Internet. The types of financial transactions that the firm computer system 12 might perform in response to a request from the user include, for example, sales of financial securities (e.g., sales or purchases of stocks, bonds, derivatives), investments in funds, such as mutual funds, ETFs, etc., and fund transfers, deposits and withdrawals. As part of the process of executing the requested transaction, the firm computer system 12 can, under certain conditions, make a determination of whether the requested transaction is risky in terms of potentially being fraudulent. The process of performing such a determination can include, at step 1, the user device 14 downloading an application onto the user device 14 from an application server 16 of the firm computer system 12. The downloaded application, once installed on the user device 14, allows the user to login to the user's account with the firm and to request transactions. The application also collects and transmits, via an electronic data network such as the Internet, fraud and/or telemetry data to the incumbent third party fraud telemetry vendor 18 at step 2. The collected fraud/telemetry data could comprise, for example, an IP address for the user device 14, a device type for the user device 14, a browser type for the user device 14, a geolocation for the user device 14, a version ID for the application downloaded to the user device 14, etc.

At step 3, the user, via the user device 14, submits a request, via the application, to the application server(s) 16 of the firm computer system 12. The request may be a login request (e.g., a request to login into the user's account), a request for a financial transaction to be performed for the user by the first computer system 12, or some other type of request that could be handled and performed by the application server 16 or otherwise by the firm computer system 12. At step 4, upon receiving the request, the application server 16 communicates with the incumbent third party fraud telemetry vendor 18 to verify the fraud/telemetry data in the user's request from step 3. For example, the application server 16 may send telemetry data, via an electronic data network, such as the Internet, from the user's request from step 3 to the incumbent third party fraud telemetry vendor 18. In turn, the incumbent third party fraud telemetry vendor 18 analyzes the telemetry data in the user's request based on, among other things, the telemetry data collected at step 2. The incumbent third party fraud telemetry vendor 18 then sends a response to the application server 16, via the electronic data network. The electronic communications between the application server 16 and the incumbent third party fraud telemetry vendor 18 can be sent via, for example, an Application Programming Interface (API) that uses HTTP as the transfer protocol (i.e., a "HTTP API"). As such, the messages between the application server 16 and the incumbent third party fraud telemetry vendor 18 may comprise HTTP requests according to pre-established formats.

At step 5, the fraud/telemetry data from the incumbent third party fraud telemetry vendor 18 is encapsulated and marshalled into an existing data flow to a fraud decisioning engine orchestration system 22. At step 6, the fraud decisioning engine orchestration system 22 sends the fraud/telemetry data to the appropriate fraud decisioning engine 24A for the incumbent third party fraud telemetry vendor 18. Additional fraud decisioning engines 24B-C are shown in FIG. 1 to illustrate that the first computer system might use more than one incumbent third party fraud telemetry vendors before an additional one is added, as described below in connection with FIG. 2. At step 7, the fraud decisioning engine 24A unencapsulates and/or unmarshals the fraud telemetry data from the incumbent third party fraud telemetry vendor 18 (from step 4) and transmits a response back to the fraud decisioning engine orchestration system 22. At step 8, the fraud decisioning engine orchestration system 22 leverages the response from the fraud decisioning engine 24A, and the other fraud decisioning engines 24B-C if applicable, to render a decision, which decision is communicated back to the application server(s) 16. The decision could be, for example, that the user request is not fraudulent (e.g., the risk of fraud is below a threshold), that the user request is block because it is potentially fraudulent (e.g., the risk of fraud is above a threshold), or that some other user action is required, such as two-factor authentication or completion of a challenge-response task (e.g., if the risk of fraud is above a threshold, which threshold can be different from the threshold for blocking the transaction).

The fraud decisioning engine orchestration system 22 is a computer system that is programmed to automate coordination and management of the fraud decisioning engines 24A-C. The decisioning engines 24A-C are computer systems that are programmed to automate a decision using business rules. The decisions in this case can be that the risk level associated with the user request is above a first threshold such that the request should be block, above another (e.g., second) threshold such that additional user action is required (e.g., two factor authentication), or that the risk level is sufficiently low such that the request is granted and is processed as requested.

The user device 14 and firm computer system 12 preferably communicate via HTTP. As such, HTTP requests from the user device 14 comprise several HTTP headers. The HTTP headers comprise name-value pairs, with the name for a HTTP header separated by the corresponding value by a colon, for example. The specific HTTP headers used are specified by the application downloaded by the user device at step 1 and are determined, in part, by the requirements and/or operation of the incumbent 3rd party fraud telemetry vendor 18. In that connection, the HTTP headers can include one or more headers that are used for fraud/telemetry purposes (as opposed to other HTTP headers for non-fraud/telemetry purposes, such as content-encoding, for example).

Figure 2:
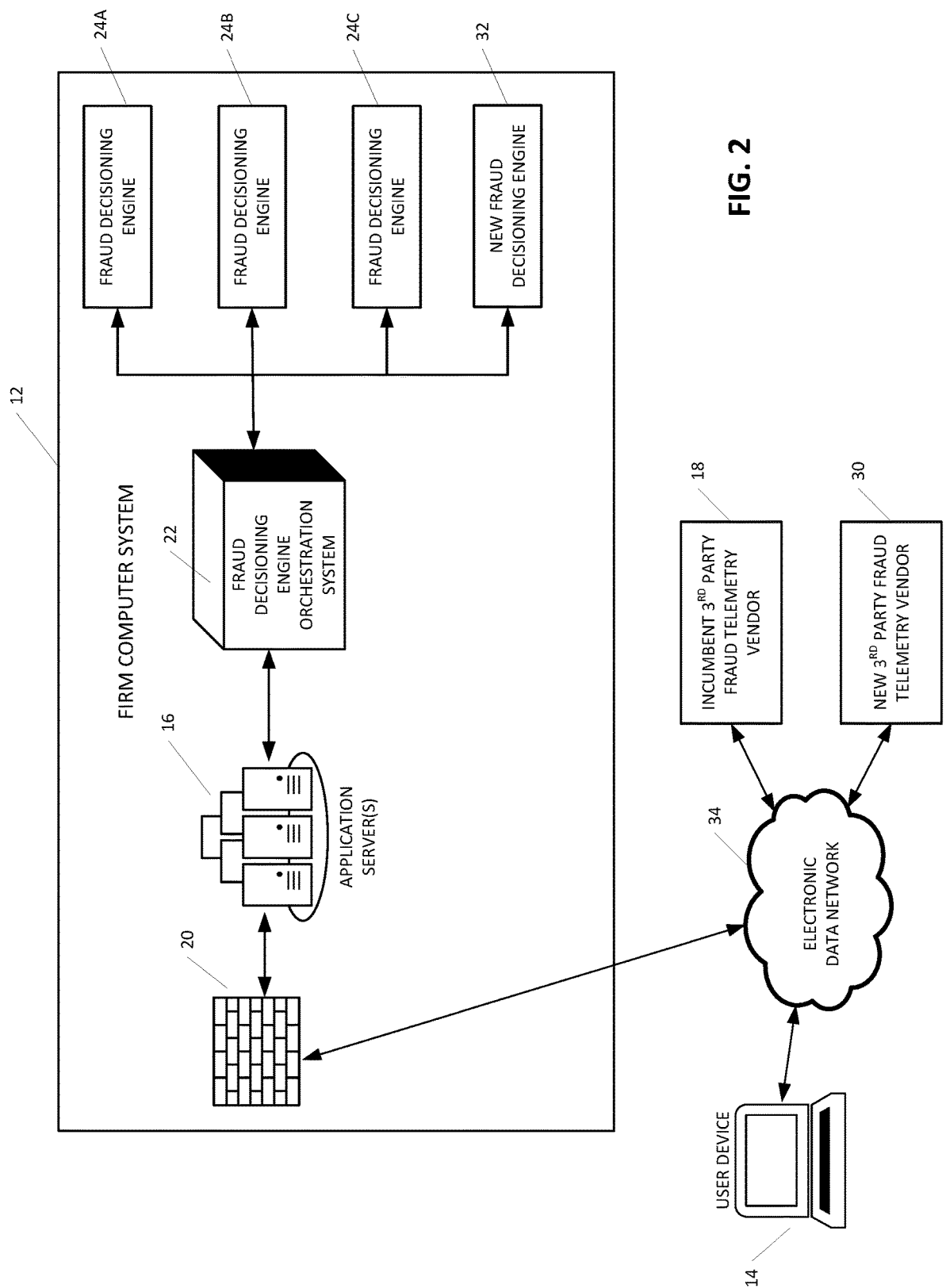
FIG. 2 is a diagram of the firm computer system that is configured to communicate with both an incumbent third party fraud telemetry vendor and a new third party fraud telemetry vendor according to various embodiments of the present invention.

With reference to FIG. 2, in various embodiments, the present invention uses an existing HTTP header for the incumbent fraud/telemetry vendor 18 for a new fraud/telemetry vendor 30. The firm computer system 12 can also add a new fraud decisioning engine 32 for the new fraud/telemetry vendor 30. This arrangement advantageously reduces the amount of revisions that need to be made to the fraud decisioning engine orchestration system 22. For example, the data for the new fraud/telemetry vendor 18 can be appended to the value for the existing HTTP header using a defined delimiting syntax. The existing logic of the fraud decisioning engine orchestration system 22 is already programmed to detect the existing header as part of being programmed to handle the data from the incumbent fraud/telemetry vendor 18. That way, using its existing logic, the fraud decisioning engine orchestration system 22 can send the value for the header to the appropriate fraud decisioning engine 24A-C. The existing fraud decisioning engine 24A for the incumbent third party fraud telemetry vendor 18 will need to have a new rule(s) added to it to remove the additional values appended for the new vendor. Further, the new fraud decisioning engine 32 will need to be programmed to look for its data in the existing HTTP header for the incumbent third party fraud telemetry vendor 18 and to ignore data in the HTTP header for ignore the data in the header for the incumbent third party fraud telemetry vendor 18.

As an example, the incumbent third party fraud telemetry vendor 18 has an existing, telemetry-related HTTP header, which for purposes of this discussion is denoted as "FraudHeader1." As a HTTP header, the request from the user at step 3 (see FIG. 1) will include a value, denoted "xxxxx" herein for discussion purposes, for the incumbent third party fraud telemetry vendor 18. Thus, the name-value pair in the user request at step 3 for the incumbent third party fraud telemetry vendor 18 might have a name-value pair like FraudHeader1:xxxxx. In various embodiments, the telemetry-related header can be, for example, "UserEndpointIdentifier," which is nominally telemetry-related as its value identifies an end point for the client device. Another (or multiple) telemetry-related headers could be used. Telemetry-related headers can relate, for example, to data about the client device 14, including versions of the software (e.g., browsers or apps) on the client device 14, an IP address for the client device 14, data about the communication links and networks used by the client device 14, etc. The telemetry-related headers are different from other potential headers used in the HTTP requests, such as headers for metadata about the request, such as language, encoding, content length, etc.

To add the new third party fraud telemetry vendor 30, the application downloaded by the user at step 1 of FIG. 1 will integrate the new third party fraud telemetry vendor 30. Alternatively, users that already had the application prior to integration of the new third party fraud telemetry vendor 30 might have their application upgrade to integrate the new third party fraud telemetry vendor 30. As such, at step 2, the application collects and transmits, via the electronic data network 34, fraud and/or telemetry data to the new third party fraud telemetry vendor 30. That way, when the user submits a request at step 3 after integration of the new third party fraud telemetry vendor 30, at step 4 the new third party fraud telemetry vendor 30 appends its data (e.g., variables and corresponding values) to the existing telemetry-related HTTP header, e.g., FraudHeader1 in this example, for the incumbent third party fraud telemetry vendor 18 using a defined delimiting syntax. For example, assume that the syntax is that two vertical lines, i.e., ||, denotes the start of a variable identifier-value pair for the new third party fraud telemetry vendor 30, and a single vertical line, i.e., |, is used to associate the variable identifiers with their corresponding values.

Figure 3:
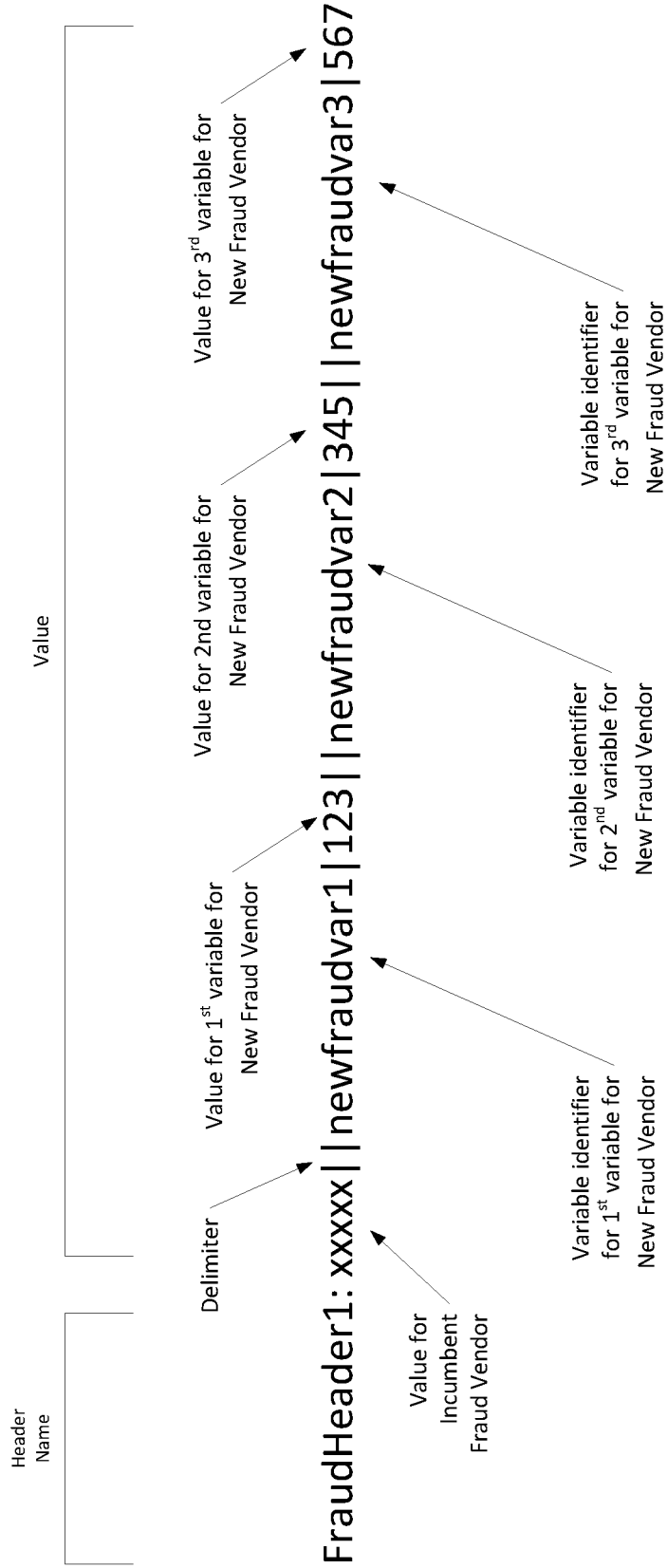
FIG. 3 shows a telemetry-related HTTP header that includes data for both the incumbent third party fraud telemetry vendor and the new third party fraud telemetry vendor according to various embodiments of the present invention.

As an example, the HTTP header from the new third party fraud telemetry vendor 30 may be as shown in FIG. 3. As a HTTP header, it includes a name-value pair separated by a colon. In this case, the name is one of the telemetry-related header names used by the incumbent third party fraud telemetry vendor 18, which is in this generic example, "FraudHeader1." The value is to the right of the colon. In the illustrated example, it includes the value (i.e., "xxxxx" in this generic example) for the incumbent third party fraud telemetry vendor 18 for the header, as well as the variable ID-value pairs for the new third party fraud telemetry vendor 30. The illustrated example includes three variables (that is, newfraudvar1, newfraudvar2 and newfraudvar3 in this example) for the new third party fraud telemetry vendor 30, with the corresponding values (that is, 123, 345 and 567 in this example) for each of the variable IDs. Two vertical lines, i.e., ||, denote the start of one of the variable identifier-value pairs for the new third party fraud telemetry vendor 30, and a single vertical line, i.e., |, is used to associate the variable identifiers with their corresponding values.

The fraud decisioning engine orchestration system 22 is already programmed with existing logic to handle HTTP header with this name due to the incumbent third party fraud telemetry vendor 18. The existing fraud decisioning engine 24A will need to have a rule added to instruct the existing fraud decisioning engine 24A to remove the data for the new third party fraud telemetry vendor 30 from the HTTP header, such as shown in the example of FIG. 4, so that existing fraud decisioning engine 24A can function as before for the incumbent third party fraud telemetry vendor 18. Basically, the existing fraud decisioning engine 24A strips out the portions of the value for the HTTP header starting with the marker (e.g., this example) for the first variable for the new third party fraud telemetry vendor 30. The portion in the dashed-line box marked "Ignore This Part" in FIG. 4 is the data that the existing fraud decisioning engine 24A ignores.

On the other hand, the new decisioning engine 32 has a rule to strip out or ignore the telemetry data for the incumbent third party fraud telemetry vendor 18. The new decisioning engine 32 can ignore the portion of the value prior to the first marker (e.g., || this example) denoting the variables and values for the new third party fraud telemetry vendor 30, as shown in FIG. 5. The portion in the dashed-line box marked "Ignore This Part" in FIG. 5 is the data that the new fraud decisioning engine 32 ignores. With this arrangement, the firm computer system 12 can transport the fraud/telemetry data from the new third party fraud telemetry vendor 30 to the new fraud decisioning engine 32 using the existing setup or ecosystem (i.e., the setup that existing for the incumbent third party fraud telemetry vendor 18 prior to the addition of the new third party fraud telemetry vendor 30) without any changes to the application server(s) 16 or the fraud decisioning engine orchestration system 22. The only changes are specific and localized to the fraud decisioning engines, e.g., stripping out or ignoring the information from the HTTP header that are not relevant for the specific fraud decisioning engine, as shown in connection with FIGS. 4 and 5.

In the description above, the data from the new third party fraud telemetry vendor 30 is appended to a single HTTP header. In other embodiments, if the size constraints for the HTTP headers for the incumbent third party fraud telemetry vendor 18 are too low so that the new third party fraud telemetry vendor 30 is likely to need multiple HTTP headers to convey its fraud/telemetry data, additional headers could be used in the same manner as described above. The fraud decisioning engines 24A, 32 would need rules as described above to look for the information relative to each fraud decisioning engine 24A, 32.

The systems of the firm computer system 12, such as the application servers 16, the fraud decisioning engine orchestration system, and the fraud decisioning engines 24A-C, 32, may be implemented with computer devices, each having one or multiple processing cores. Each component may be implemented as one or number of networked computer devices. Further, the firm computer system 12 may interconnect the components 16, 22, 24A-C, 32 with data networks, such as LANs, WANs, the Internet, etc., using suitable wired and/or wireless data communication links. Data may be shared between the components 16, 22, 24A-C, 32 using suitable data links, such as data buses (preferably high-speed data buses) or network links (e.g., Ethernet). The incumbent and new third party fraud telemetry vendors 18, 30 are computer systems outside the firm computer system 12. The incumbent and new third party fraud telemetry vendors 18, 30 can communicate with the firm computer system 12 via HTTP APIs. The incumbent and new third party fraud telemetry vendors 18, 30 can be in communication with the firm computer system 12 via the electronic data network 34.

The software for the various machine learning systems described herein and other computer functions described herein may be implemented in computer software using any suitable computer programming language, such as .NET, C, C++, or Python, and using conventional, functional, or object-oriented techniques. For example, the various machine learning systems may be implemented with software modules stored or otherwise maintained in computer readable media, e.g., RAM, ROM, secondary storage, etc. One or more processing cores (e.g., CPU or GPU cores) of the machine learning system may then execute the software modules to implement the function of the respective machine learning system (e.g., student, coach, etc.). Programming languages for computer software and other computer-implemented instructions may be translated into machine language by a compiler or an assembler before execution and/or may be translated directly at run time by an interpreter. Examples of assembly languages include ARM, MIPS, and x86; examples of high-level languages include Ada, BASIC, C, C++, C#, COBOL, Fortran, Java, Lisp, Pascal, Object Pascal, Haskell, ML; and examples of scripting languages include Bourne script, JavaScript, Python, Ruby, Lua, PHP, and Perl.

In various embodiments, therefore, the present invention is directed to a firm computer system for processing user requests. The firm computer system comprises a fraud decisioning engine orchestration system that is in communication with a first external telemetry vendor and a second external telemetry vendor. The first and second external telemetry vendors are external to the firm computer system; and the first and external telemetry vendors communicate with the fraud decisioning engine orchestration system for a user request using HTTP requests that include HTTP headers. The HTTP headers include a first telemetry-related HTTP header, such that: the first external telemetry vendor is configured to include telemetry data for the user request from the first external telemetry vendor in the first telemetry-related HTTP header; and the second external telemetry vendor is configured to append telemetry data for the user request from the second external telemetry vendor to the first telemetry-related HTTP header, such that the telemetry data for the user request from the second external telemetry vendor appended to the first telemetry-related HTTP is separated in the first telemetry-related HTTP from the telemetry data from the first external telemetry vendor according to a predefined syntax. The firm computer system further comprises a first fraud decisioning engine in communication with the fraud decisioning engine orchestration system. The first fraud decisioning engine is associated with the first external telemetry vendor, and the first fraud decisioning engine is configured to ignore the telemetry data for the user request from the second external telemetry vendor in the telemetry-related HTTP header based on the predefined syntax. The firm computer system further comprises a second fraud decisioning engine in communication with the fraud decisioning engine orchestration system. The second fraud decisioning engine is associated with the second external telemetry vendor, and the second fraud decisioning engine is configured to ignore the telemetry data for the user request from the first external telemetry vendor in the telemetry-related HTTP header based on the predefined syntax.

In another general aspect, the present invention is directed to a method of configuring a firm computer system of a firm to add a new third party telemetry vendor. Prior to addition of the new third party telemetry vendor the firm computer system, the firm computer system has an incumbent third party telemetry vendor, where the incumbent third party telemetry vendor communicates with the firm computer system using HTTP requests that include HTTP headers. The HTTP headers include a first telemetry-related HTTP header. The method comprises the step of configuring the new third party telemetry vendor to communicate with the firm computer system using HTTP requests that include the first telemetry-related HTTP vendor. Configuring the third party telemetry vendor to communicate with the firm computer system using HTTP requests that include the first telemetry-related HTTP vendor comprises, for a user request of the firm computer system, configuring the third party telemetry vendor to append telemetry data for the user request from the new third party telemetry vendor to the first telemetry-related HTTP, where the telemetry data for the user request from the new third party telemetry vendor appended to the first telemetry-related HTTP is separated in the first telemetry-related HTTP from telemetry data from the incumbent third party telemetry vendor according to a predefined syntax. The method also comprises the step of configuring a first fraud decisioning engine of the firm computer system, where the first fraud decisioning engine is associated with the incumbent third party telemetry vendor, to ignore the telemetry vendor data for the user request from the new third party telemetry vendor from the telemetry-related HTTP header based on the predefined syntax. The method also comprises the step of configuring a second fraud decisioning engine of the firm computer system, where the second fraud decisioning engine is associated with the new third party telemetry vendor, to ignore the telemetry vendor data for the user request from the incumbent third party telemetry vendor from the telemetry-related HTTP header based on the predefined syntax.

In various implementations, the firm computer system comprises a fraud decisioning engine orchestration system for transmitting the telemetry data from the incumbent and new third party telemetry vendors for the user request to an appropriate fraud decisioning engine.

In various implementations, the first fraud decisioning engine is configured to unencapsulate the telemetry for the user request data from the incumbent third party telemetry vendor and to transmit a first response for the user request to the fraud decisioning engine orchestration system; and the second fraud decisioning engine is configured to unencapsulate the telemetry for the user request data from the new third party telemetry vendor and to transmit a second response for the user request to the fraud decisioning engine orchestration system.

In various implementations, the fraud decisioning engine orchestration system is configured to render a decision on the user request based on the responses from the first and second fraud decisioning engines for the user request.

In various implementations, the decision comprises a decision selected from the group consisting of blocking the user request, approving the user request, and requesting additional action from a user associated with the user request.

The examples presented herein are intended to illustrate potential and specific implementations of the present invention. It can be appreciated that the examples are intended primarily for purposes of illustration of the invention for those skilled in the art. No particular aspect or aspects of the examples are necessarily intended to limit the scope of the present invention. Further, it is to be understood that the figures and descriptions of the present invention have been simplified to illustrate elements that are relevant for a clear understanding of the present invention, while eliminating, for purposes of clarity, other elements. While various embodiments have been described herein, it should be apparent that various modifications, alterations, and adaptations to those embodiments may occur to persons skilled in the art with attainment of at least some of the advantages. The disclosed embodiments are therefore intended to include all such modifications, alterations, and adaptations without departing from the scope of the embodiments as set forth herein.

What is claimed is:

1. A method of configuring a computer system of a firm to add a new third party telemetry system, wherein prior to addition of the new third party telemetry system to the computer system, wherein the computer system is communicably coupled to an incumbent third party telemetry system, and wherein the incumbent third party telemetry system communicates with the computer system using hypertext transfer protocol (HTTP) requests that include HTTP headers, wherein the HTTP headers include a first telemetry-related HTTP header, the method comprising:

receiving, by the computer system of the firm, from the new third party telemetry system, HTTP requests, wherein the HTTP requests include, for a user request of the computer system:
the first telemetry-related HTTP header;
first telemetry data for the user request appended by the incumbent third party telemetry system to the first telemetry-related HTTP header; and
second telemetry data for the user request appended by the new third party telemetry system to the first telemetry-related HTTP header, such that the second telemetry data is separated in the first telemetry-related HTTP header from the first telemetry data from the incumbent third party telemetry system according to a predefined syntax;

identifying as non-actionable, by a first fraud decisioning engine of the computer system that is associated with the incumbent third party telemetry system, the second telemetry data appended by the new third party telemetry system to the first telemetry-related HTTP header based on the predefined syntax, such that the first fraud decisioning engine provides a first response for the user request based on the first telemetry data from the incumbent third party telemetry system; and identifying as non-actionable, by a second fraud decisioning engine of the computer system that is associated with the new third party telemetry system, the first telemetry data appended by the incumbent third party telemetry system to the first telemetry-related HTTP header based on the predefined syntax, such that the second fraud decisioning engine provides a second response for the user request based on the second telemetry data from the new third party telemetry system.

2. The method of claim 1, wherein the computer system comprises a fraud decisioning engine orchestration system for transmitting the first telemetry data from the incumbent third party telemetry system and the second telemetry data from the new third party telemetry system for the user request to an appropriate fraud decisioning engine.

3. The method of claim 2, wherein the first fraud decisioning engine is configured to unencapsulate the first telemetry data for the user request appended by the incumbent third party telemetry system and to transmit the first response for the user request to the fraud decisioning engine orchestration system; and the second fraud decisioning engine is configured to unencapsulate the second telemetry data for the user request appended by the new third party telemetry system and to transmit the second response for the user request to the fraud decisioning engine orchestration system.

4. The method of claim 3, wherein the fraud decisioning engine orchestration system is configured to render a decision on the user request based on the first and second responses from the first and second fraud decisioning engines for the user request.

5. The method of claim 4, wherein the decision is selected from at least one of: blocking the user request, approving the user request, or requesting additional action from a user associated with the user request, or any combination thereof.

6. A firm computer system for processing user requests, the firm computer system comprising;
a fraud decisioning engine orchestration system that is in communication with a first external telemetry system and a second external telemetry system, wherein:
the first and second external telemetry system are external to the firm computer system;
the first and second external telemetry systems communicate with the fraud decisioning engine orchestration system for a user request using hypertext transfer protocol (HTTP) requests that include HTTP headers; and
the HTTP headers include a first telemetry-related HTTP header, such that:
the first external telemetry system is configured to append first telemetry data for the user request to the first telemetry-related HTTP header; and
the second external telemetry system is configured to append second telemetry data for the user request to the first telemetry-related HTTP header, such that the second telemetry data appended by the second external telemetry system to the first telemetry-related HTTP header is separated in the first telemetry-related HTTP header from the first telemetry data appended by the first external telemetry system according to a predefined syntax;
a first fraud decisioning engine in communication with the fraud decisioning engine orchestration system, wherein the first fraud decisioning engine is associated with the first external telemetry system, and wherein the first fraud decisioning engine is configured to identify as non-actionable the second telemetry data associated with the second external telemetry system in the first telemetry-related HTTP header based on the predefined syntax; and
a second fraud decisioning engine in communication with the fraud decisioning engine orchestration system, wherein the second fraud decisioning engine is associated with the second external telemetry system, and wherein the second fraud decisioning engine is configured to identify as non-actionable the first telemetry data associated with the first external telemetry system in the first telemetry-related HTTP header based on the predefined syntax.

7. The firm computer system of claim 6, wherein the firm computer system is for transmitting the first telemetry data from the first external telemetry system and the second telemetry data from the second external telemetry system for the user request to an appropriate fraud decisioning engine.

8. The firm computer system of claim 7, wherein:
the first fraud decisioning engine is configured to unencapsulate the first telemetry data for the user request appended by the first external telemetry system and to transmit a first response for the user request to the fraud decisioning engine orchestration system; and
the second fraud decisioning engine is configured to unencapsulate the second telemetry data for the user request appended by the second external telemetry system and to transmit a second response for the user request to the fraud decisioning engine orchestration system.

9. The firm computer system of claim 8, wherein the fraud decisioning engine orchestration system is configured to render a decision on the user request based on the first and second responses from the first and second fraud decisioning engines for the user request.

10. The firm computer system of claim 9, wherein the decision is selected from at least one of: blocking the user request, approving the user request, or requesting additional action from a user associated with the user request, or any combination thereof.

* * * * *